(12) United States Patent
Takehara

(10) Patent No.: US 8,975,859 B2
(45) Date of Patent: Mar. 10, 2015

(54) ENERGY STORAGE SYSTEM

(75) Inventor: Kiyotaka Takehara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 405 days.

(21) Appl. No.: 13/500,387

(22) PCT Filed: Oct. 1, 2010

(86) PCT No.: PCT/IB2010/002488
§ 371 (c)(1),
(2), (4) Date: May 8, 2012

(87) PCT Pub. No.: WO2011/042786
PCT Pub. Date: Apr. 14, 2011

(65) Prior Publication Data
US 2012/0235625 A1   Sep. 20, 2012

(30) Foreign Application Priority Data

Oct. 5, 2009   (JP) ................. 2009-232007

(51) Int. Cl.
*H02J 7/00* (2006.01)
*H01M 10/46* (2006.01)
(Continued)

(52) U.S. Cl.
CPC ............ *H01M 10/465* (2013.01); *H01M 10/44* (2013.01); *H02J 3/32* (2013.01); *H02J 3/383* (2013.01); *H02J 7/35* (2013.01);
(Continued)

(58) Field of Classification Search
CPC ........... H02J 7/35; H02J 3/383; H02J 7/0011; H02J 7/0018; H02J 7/0073; H02J 7/047; Y02E 60/12; Y02E 10/566; H01M 10/44; H01M 10/465; Y02T 10/7005
USPC .................................................. 320/101, 136
See application file for complete search history.

(56) References Cited

U.S. PATENT DOCUMENTS 5,369,353 A * 11/1994 Erdman .................. 323/207
6,127,805 A * 10/2000 Kikuchi et al. ............. 320/132
(Continued)

FOREIGN PATENT DOCUMENTS

| CN | 1440583 | 9/2003 |
|---|---|---|
| JP | 10-243572 | 9/1998 |

(Continued)

OTHER PUBLICATIONS

International Search Report for corresponding International Application No. PCT/IB2010/002488 mailed Feb. 1, 2011.
(Continued)

*Primary Examiner* — Sun Lin
(74) *Attorney, Agent, or Firm* — Renner, Otto, Boisselle & Sklar, LLP

(57) ABSTRACT

In an energy storage system, power from at least one of a solar cell, a commercial AC power source, and a storage battery is supplied to load devices. In the daytime, under the condition that an amount of power generated by the solar cell is less than an amount of power consumed by the load device, the discharge from the storage battery to the load device is permitted or prohibited if the charge level of the storage battery is higher or is not higher than the reference charge level. The discharge from the storage battery which makes the charge level of the storage battery lower than the reference level is permitted at night.

19 Claims, 8 Drawing Sheets

(51) Int. Cl.
  *H01M 10/44* (2006.01)
  *H02J 3/32* (2006.01)
  *H02J 3/38* (2006.01)
  *H02J 7/35* (2006.01)
  *G01D 4/00* (2006.01)

(52) U.S. Cl.
  CPC .............. G01D 4/004 (2013.01); *Y02B 10/14* (2013.01); *Y02E 10/566* (2013.01); *Y02B 70/346* (2013.01); *Y02B 90/242* (2013.01); *Y02E 70/30* (2013.01); *Y02E 10/563* (2013.01); *Y04S 20/322* (2013.01); *Y04S 20/525* (2013.01)
  USPC .......................................... 320/101; 320/136

(56) References Cited

U.S. PATENT DOCUMENTS

| 6,900,556 | B2 * | 5/2005 | Provanzana et al. | 307/19 |
|---|---|---|---|---|
| 8,045,316 | B2 * | 10/2011 | Nerheim | 361/232 |
| 8,536,835 | B2 * | 9/2013 | Tanaka et al. | 320/134 |
| 8,541,982 | B2 * | 9/2013 | Shimayama et al. | 320/134 |
| 2001/0040441 | A1 | 11/2001 | Ng et al. | |
| 2007/0145952 | A1 * | 6/2007 | Arcena | 320/135 |
| 2011/0210702 | A1 * | 9/2011 | Shimayama et al. | 320/134 |
| 2012/0056591 | A1 * | 3/2012 | Abe et al. | 320/132 |

FOREIGN PATENT DOCUMENTS

| JP | 2002-095168 | 3/2002 |
|---|---|---|
| JP | 2009-124843 | 6/2009 |
| JP | 2009-159730 | 7/2009 |

OTHER PUBLICATIONS

Form PCT/ISA/237 for corresponding International Application No. PCT/IB2010/002488 dated Feb. 1, 2011.

* cited by examiner (A) SOLAR POWER GENERATION AMOUNT AND DC POWER USAGE (B) CHARGING AMOUNT (C) COMMERCIAL AC POWER USAGE AMOUNT (A) SOLAR POWER GENERATION AMOUNT AND DC POWER USAGE (B) CHARGING AMOUNT (C) COMMERCIAL AC POWER USAGE AMOUNT (A) SOLAR POWER GENERATION AMOUNT AND DC POWER USAGE (B) CHARGING AMOUNT (C) COMMERCIAL AC POWER USAGE AMOUNT

ENERGY STORAGE SYSTEM

FIELD OF THE INVENTION

The present invention relates to an energy storage system including a solar cell, a commercial AC power source and a storage battery in which the storage battery is charged with the power from the solar cell and the power from at least one of the solar cell, the commercial AC power source and the storage battery is supplied to one or more load devices. Background of the Invention

BACKGROUND OF THE INVENTION

There has been known an energy storage system which is fully charged with electric power from a solar cell and discharges during an emergency such as a power failure. Such an energy storage system discharges only in an emergency. However, such a systems does not sufficiently use the solar cell since the discharge from the storage battery is carried out only in an emergency. Therefore, there has been proposed an energy storage system which allows power to be discharged up to a predetermined threshold value in non-emergency situations to promote effective use of electric power from the solar cell (see, e.g., Japanese Patent Application Publication No. 2009-159730). The threshold value is set to a capacity which makes it possible to supply electric power to be used upon a power failure.

In terms of energy savings, it can be thought that electric power which is used at home be obtained from solar energy by charging a storage battery with electric power generated by solar power generation in the daytime and discharging the electric power from the storage battery at night.

However, in the conventional energy storage system, the electric power discharged from the storage battery irrespective of whether it is day or night when the electric power by the solar power generation is less than electric power that is consumed by load devices. In this case, the electric power required to the load device may not be furnished by only the discharge from the storage battery at night.

SUMMARY OF THE INVENTION

In view of the above, the present invention provides an energy storage system that can prevent a shortage of the electric power of a storage battery at night.

In accordance with an aspect of the present invention, there is provided an energy storage system including a storage battery, wherein, when a charge level of the storage battery is not greater than a reference charge level, a discharge from the storage battery to a load device is permitted or prohibited depending on a time zone.

The energy storage system may further include a solar cell and a commercial AC power source, wherein the storage battery is charged with electric power from the solar cell, wherein electric power from at least one of the solar cell, the commercial AC power source, and the storage battery is supplied to the load device, wherein, in the daytime, when an amount of electric power generated by the solar cell is less than an amount of electric power consumed by the load device and the charge level of the storage battery is higher than the reference charge level, the discharge from the storage battery to the load device is permitted, wherein, in the daytime, when the amount of electric power generated by the solar cell is less than the amount of electric power consumed by the load device and the charge level of the storage battery is not higher than the reference charge level, the discharge from the storage battery to the load device is not permitted, and wherein the discharge from the storage battery which makes the charge level of the storage battery lower than the reference level is permitted at night.

With such configurations, the storage battery is charged with the power from the solar cell in the daytime, and the discharge from the storage battery is permitted at night when there is a shortage in power because the amount of electric power generated by the solar cell does not exceed the power consumed by the load device. Meanwhile, when the charge level of the storage battery is less than a first charge level, power that is supposed to be used at night is ensured by prohibiting the discharge from the storage battery. At night, the power stored in the daytime is used by allowing the capacity of the storage battery to drop below the first storage level. Accordingly, when the electric power is supplied at night by the discharge from the storage battery, it is possible to reduce the case where the electric power by the discharge from the storage battery cannot be supplied.

Further, a backup level may be set as a reference value of the charge level of the storage battery, the backup level being lower than the reference charge level and corresponding to an amount of electric power that is used in an emergency in which electric power is not supplied from the solar cell nor the commercial AC power source to the load device. In this case, supply of electric power from at least one of the solar cell and the commercial AC power source to the load device is performed so that the charge level of the storage battery is equal to or higher than the backup level in the daytime and at night. In the emergency, the discharge from the storage battery which makes the charge level lower than the backup level is permitted.

With such configurations, in the daytime and at night, the charge level of the storage battery remains equal to or greater than the second charge level. In an emergency in which the supply of the electric power from the commercial AC power source is interrupted, the discharge from the storage battery is allowed so that the electric power can be furnished to the load device even in the emergency.

Further, when, in the daytime, the amount of electric power generated by the solar cell is less than the amount of electric power consumed by the load device and the charge level of the storage battery is not higher than the reference charge level, determination process may be performed based on past charge level change data in which a time period during which the charge level reaches a fully charged level is equivalent to a predetermined time period or more, to determine whether or not the charge level recovers to the reference charge level before night in a state in which the discharge from the storage battery is permitted, and when the charge level is determined to recover by the determination process, the permission of the discharge from the storage battery to the load device is maintained.

With such configurations, in the daytime, when the amount of electric power generated by the solar cell is less than the amount of electric power consumed by the load devices and the charge level of the storage battery has reached a lower level from a higher level than the first charge level, the following process is performed. That is, by referring to, from among past charge level change data, the past charge level change data in which a time period during which the charge level reaches the fully charged level is equivalent to a predetermined time period or more, whether or not the charge level will recover up to the first charge level is determined based thereon. Here, when the charge level is determined to recover up to the first charge level, the permission of the discharge from the storage battery to the load device is maintained.

Specifically, in the daytime, when the charge level drops below the first charge level, typical process does not permit the discharge from the storage battery to ensure electric power to be used at night. However, when the recovery of the charge level is estimated by the determination, the discharge from the storage battery to the load device is permitted. In this way, the storage capacity of the storage battery can be optimally used depending on the situation in which the charge level of the storage battery is lowered, thereby reducing the amount of electric power from the commercial AC power source.

Further, in the determination process, based on similarity between charge level change data indicating a past change in the charge level of the storage battery, and charge level change data on a date when the determination process is performed, a past date having a charge level change which approximates a charge level change on the date of the determination process may be selected. Further, it is determined whether or not a full charge level period during which the charge level reaches a full charge level in the charge level change data on the selected date is equivalent to a predetermined time period or more, and when the full charge level period is determined to be equivalent to the predetermined time period or more, it is determined that the charge level will recover and the permission of the discharge from the storage battery to the load device is maintained.

With such configurations, in the determination as to whether or not the charge level will recover, as described above, the past charge level change data, which approximates the charge level change data on the date when the determination processing is performed, is selected. And, it is determined whether or not the full charge level period is equivalent to the predetermined time period or more in the charge level on the date of the selected charge level change data. That is, since whether or not the charge level on the date of the determination will recover later is determined based on the past data on the date having data approximating that on the date of the determination, the accuracy of the determination can be improved.

Further, in the determination process, based on similarity between power generation amount change data indicating a past change in power generation amount by the solar cell, and power generation amount change data on a date when the determination process is performed, a past date having a power generation amount change approximating a power generation amount change on the date of the determination process may be selected. And, it is determined whether or not a full charge level period during which the charge level reaches a full charge level in the charge level change data on the selected date is equivalent to a predetermined time period or more, and when the full charge level period is determined to be equivalent to the predetermined time period or more, it is determined that the charge level will recover and the permission of the discharge from the storage battery to the load device is maintained.

With such configurations, in the determination as to whether the charge level will recover, as described above, the past power generation amount change data, which approximates the power generation amount change data on the date when the determination processing is performed, is selected. And, it is determined whether or not the full charge level period is equivalent to the predetermined time period or more in the charge level on the date of the selected power generation amount change data. That is, since whether or not the charge level on the date of the determination will recover later is determined based on the past data on the date having data approximating that on the date of the determination, the accuracy of the determination can be improved.

Further, the reference charge level may be set to a level that corresponds to an amount of electric power that is consumed by the load device at night.

With such configurations, since the electric power used at night can be furnished with the electric power charged in the storage battery in the daytime, it is possible to reduce the use of the electric power supplied from the commercial AC power source.

Further, when time zones in which an electricity rate of the commercial AC power source is determined include a normal time zone in which the electricity rate is normal and a low-price time zone in which the electricity rate is lower than normal, the reference charge level may be set to a level corresponding to an amount obtained by deducting an amount of electric power that is used in the low-price time zone from an amount of electric power that is consumed by the load device at night.

Electricity rate of a commercial AC power source is divided into normal price and low price electricity. That is, the nighttime is divided into a normal time zone having a normal electricity rate and a low-price time zone having a lower electricity rate. The electricity charge for the consumed electric power is produced by summing a product obtained by multiplying the amount of electric power used in the normal time zone by the normal electricity rate and a product obtained by multiplying the amount of electric power used in the low-price time zone by the lower electricity rate. In addition, in consideration of the above, in the present invention, the first charge level is set as a value corresponding to the amount of electric power obtained by deducting the amount of low-price electric power that is used in the low-price time zone from the amount of electric power that is used at night. That is, in the low-price time zone, it is set such that there is a shortage in electric power and the electric power from the commercial AC power source is used in that time zone. Accordingly, as for the electric power that is used at night, the electric power that is supplied at the low rate is effectively used, and thus the electricity costs can be reduced.

In accordance with the present invention, there is provided an energy storage system capable of preventing a shortage in the electric power of the storage battery.

BRIEF DESCRIPTION OF THE DRAWINGS

The above and other objects and features of the present invention will be more apparent from the following description of exemplary embodiments taken in conjunction with the accompanying drawings, in which.

DETAILED DESCRIPTION OF THE PREFERRED EMBODIMENTS

Figure 1:
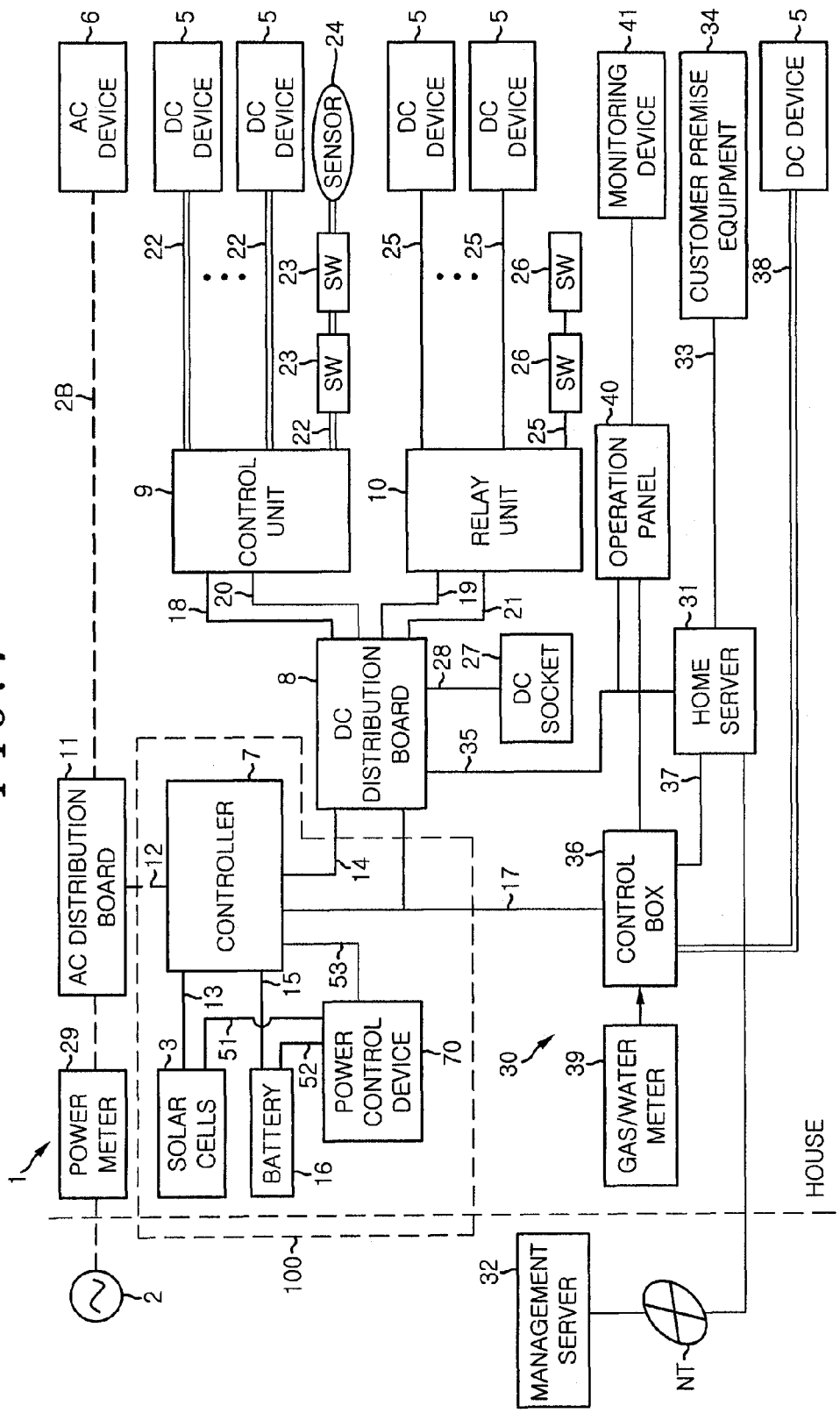
FIG. 1 is a block diagram showing a configuration of a power supply system including an energy storage system according to an embodiment of the present invention.

Embodiments of the present invention will be described in detail below with reference to the accompanying drawings which form a part hereof. Same reference numerals will be assigned to same or similar components throughout the drawings, and redundant descriptions thereof will be omitted.

Referring to FIGS. 1 to 9, an embodiment of the present invention will be described. Furthermore, the present embodiment illustrates the case where the electricity supply management device of the present invention is practiced as a part of an electricity supply system.

As shown in FIG. 1, a house is provided with an electricity supply system 1 that supplies an electric power to various types of household devices (a lighting device, an air conditioner, household electronic appliances, audio and visual devices, and the like). The electricity supply system 1 supplies to a variety of types of devices an electric power from a household commercial AC power source (AC power source) 2 and an electric power from a solar cell 3, using solar light.

The electricity supply system 1 supplies an electric power not only to DC devices 5 but also to an AC device 6. Each of the DC devices 5 is operated by a DC electric power, and the AC device 6 is operated by an AC electric power from the commercial AC power source 2. Although, in the following descriptions of the embodiment, the house is given as an example of a place where the electricity supply system 1 is installed, the place is not limited thereto. Alternatively, the electricity supply system 1 may be installed and used in a multi-family house, an apartment, an office, or a factory.

As a distribution board of the electricity supply system 1, a controller 7 and a DC distribution board 8 (including a DC breaker) are provided in the electricity supply system 1. Furthermore, in the electricity supply system 1, a control unit 9 and a relay unit 10 are provided as a device for controlling the operation of the DC devices 5 in the house.

An AC distribution board 11 for branching an AC power is connected to the controller 7 through an AC power line 12. The controller 7 is connected to the commercial AC power source 2 via the AC distribution board 11, and is connected to the solar cell 3 through a DC power line 13. The controller 7 receives an AC power from the AC distribution board 11, receives a DC power from the solar cell 3, and converts the powers into a predetermined DC power as a power for the devices. Furthermore, the controller 7 outputs the resulting DC power to the DC distribution board 8 through a DC power line 14 and to a storage battery 16 through a DC power line 15. The controller 7 receives the AC power, converts the DC power from the solar cell 3 or the storage battery 16 into an AC power, and supplies the AC power to the AC distribution board 11. The controller 7 exchanges data with the DC distribution board 8 through a signal line 17.

The DC distribution board 8 is a kind of DC power breaker. The DC distribution board 8 branches the DC power inputted from the controller 7, and outputs the resulting DC power to the control unit 9 through a DC power line 18, or to the DC relay unit 10 through a power line 19. Furthermore, the DC distribution board 8 exchanges data with the control unit 9 through a signal line 20, or with the relay unit 10 through a signal line 21.

The plural DC devices 5 are connected to the control unit 9 through DC supply lines 22 each of which is capable of carrying both DC power and data. A communications signal, carrying data by using a high frequency carrier wave, is superimposed on a DC voltage supplied as a power to the DC device 5 through the DC supply line 22. That is, both power and data are carried to the DC device by means of the power line carrier communications through the DC supply line 22 that has a pair of wires. The control unit 9 obtains the DC power for the DC devices 5 through the DC power line 18, and determines an operation control state of the DC devices 5 based on an operating instruction obtained from the DC distribution board 8 through the signal line 20. Furthermore, the control unit 9 outputs the DC power and the operating instruction to the corresponding DC device 5 through the corresponding DC supply line 22, and controls the operation of the DC device 5.

Switches (SW) 23 are connected to the control unit 9 through the DC supply line 22. The switches 23 are manipulated when the operations of the DC devices 5 are switched. Furthermore, a sensor 24 for detecting, for example, radio waves transmitted from an infrared remote control is connected to the control unit 9 through the DC supply line 22. Accordingly, the DC devices 5 are controlled by communications signals transmitted thereto through the DC supply line 22 in response not only to an operating instruction from the DC distribution board 8 but also to the manipulation of the switches 23 or the detection of the sensor 24.

Some of the DC devices 5 are connected to the relay unit 10 through respective DC power lines 25. The relay unit 10 obtains the DC power for the DC devices 5 through the DC power line 19, and determines which one of the DC devices 5 is to be operated based on an operating instruction obtained from the DC distribution board 8 through the signal line 21. Furthermore, the relay unit 10 controls the operation of the determined DC device 5 by selectively turning on and off the supply of power through the DC power line 25 by a relay provided therein. Furthermore, a plurality of switches 26 for manually manipulating the DC devices 5 are connected to the relay unit 10, and the DC devices 5 are controlled by selectively turning on and off the supply of power thereto through the DC power line 25 by the relay in response to the manipulations of the switches 26.

A DC outlet 27 that is uprightly attachable to the house, for example, in the form of a wall outlet or a bottom outlet, is connected to the DC distribution board 8 through the DC power line 28. By inserting the plug (not shown) from the DC device into the DC outlet 27, a DC power can be directly supplied to the DC device.

Furthermore, a power meter 29 capable of remotely measuring the amount of used power from the commercial AC power source 2 is connected to the AC distribution board 11. The power meter 29 has not only the function of remotely measuring the amount of commercial power used but also, for example, the function of power line carrier communications and/or wireless communications. The power meter 29 transmits the results of the measurement to an electric power company or the like through the power line carrier communications or wireless communications.

The electricity supply system 1 includes a network system 30 that enables various types of household devices to be controlled through network communications. The network system 30 includes a home server 31 that functions as a control unit of the network system 30. The home server 31 is connected to an external management server 32 through a network N, such as the Internet, and also to a customer premises equipment 34 through a signal line 33. Furthermore, the home server 31 is operated by a DC power, obtained from the DC distribution board 8 through a DC power line 35.

A control box 36 for managing the operational control of various types of home devices by using network communications is connected to the home server 31 through a signal line 37. The control box 36 is connected to the controller 7 and the DC distribution board 8 through the signal line 17, and also directly controls the DC devices 5 through a DC supply line 38. A gas/water meter 39 capable of remotely measuring, for example, the amount of gas or water used is connected to the control box 36, and a manipulation panel 40 of the network system 30 is also connected to the control box 36. A monitoring device 41 including, for example, a door phone receiver, a sensor and/or a camera is connected to the manipulation panel 40.

When operating instructions from the various types of home devices are inputted to the home server 31 through the network N, the home server 31 notifies the control box 36 of the operating instructions, and operates the control box 36 to control the various types of the home devices to perform operations based on the operating instructions. Furthermore, the home server 31 may provide various types of information, obtained from the gas/water meter 39, to the management server 32 through the network N. When receiving from the manipulation panel 40 a notification that the monitoring device 41 has detected an abnormality, the home server 31 may also provide the notification to the management server 32 through the network N.

The energy storage system 100 includes the solar cell 3, the storage battery 16, the controller 7, and a power control device 70. The energy storage system 100 controls the storage battery 16 depending on the amount of power generated by the solar cell 3 and the DC power usage amount by the DC devices 5.

The solar cell 3 periodically measures the solar power generation amount PWS, and outputs the measured solar power generation amount PWS to the power control device 70 through a signal line 51. Furthermore, the solar power generation amount PWS varies depending on both the intensity of solar light and the load connected to the solar cell 3. For example, even when the solar cell 3 has a sufficiently large capacity to generate a power, if the total amount of DC powers used by the DC devices 5 connected to the solar cell 3 is smaller than the amount of power generated by the solar cell 3, the solar cell 3 may generate the power in proportion to the total power consumption amount of the DC devices 5.

The storage battery 16 is charged and discharged in response to a request from the power control device 70. The storage battery 16 is managed by two levels, such as backup level CLB and reserve charge level CLA (reference charge level), which is a charge level higher than the backup level CLB. The backup level CLB is set in such a way that an electric power can be supplied for a predetermined period when the supply of power is interrupted in case of emergency such as a power failure in the nighttime or a fire. For example, the backup level CLB is set to a charge level corresponding to the amount of power that is used in case of emergency. The storage battery 16 is controlled so that the amount of electric power that is charged in the storage battery does not become less than the backup level CLB during normal other than the emergency.

The reserve charge level CLA is set to furnish electric power that is consumed during the nighttime. For example, the reserve charge level CLA is set to a charge level corresponding to the amount of electric power per night that is used during the nighttime. The storage battery 16 periodically measures the charge level CL, and outputs the measured charge level CL to the power control device 70 through a signal line 52. The reserve charge level CLA is set for each season. For example, the reserve charge level CLA in spring and autumn is set to be lower than in summer and winter. The set value can be changed through an interface such as a touch panel or the like.

The controller 7 includes a DC/DC converter that converts an electric power from the solar cell 3 into a low-voltage DC power. By the DC/DC converter, the electric power generated by the solar cell 3 is converted into a power of a predetermined voltage. The controller 7 converts an electric AC power from the commercial AC power source 2 into a DC power or converts the DC power from the solar cell 3 or the battery 16 into an electric AC power in response to a request from the power control device 70. For example, when the amount of DC power PWD used by the DC devices 5 is larger than the solar power generation amount PWS by the solar cell 3 and the DC power is insufficient, the AC power is converted into a DC power by the controller 7, thereby compensating for a deficit in the DC power.

Meanwhile, when a DC power usage amount PWD by the DC devices 5 is smaller than the solar power generation amount PWS by the solar cell 3 and an excess of power is generated by the solar cell 3, the remaining DC power is converted into an AC power by the controller 7. The controller 7 measures an AC-DC power amount obtained by converting the AC power into a DC power and a DC-AC power amount obtained by converting the DC power into an AC power, and outputs these measured power amounts to the power control device 70 through the signal line 53.

The power control device 70 will now be described with reference to FIG. 2.

Figure 2:
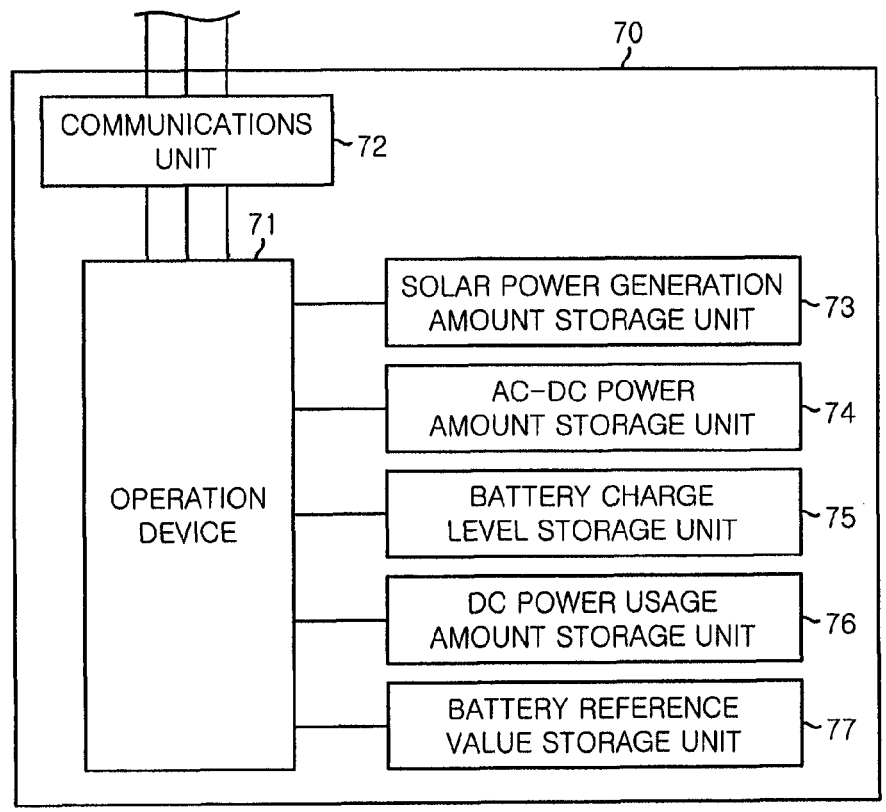
FIG. 2 is a block diagram showing a configuration of a power control device in the energy storage system.

As shown in FIG. 2, the power control device 70 includes an operation device 71; a communications unit 72 for performing information communications with an external device including the solar cell 3, the control unit 7 and the storage battery 16; a solar power generation amount storage unit 73; a AC-DC power amount storage unit 74; a battery charge level storage unit 75; a DC power usage amount storage unit 76; and a battery reference value storage unit 77.

The communications unit 72 receives information such as the solar power generation amount PWS, the charge level CL, the AC-DC power amount, and the DC-AC power amount outputted from the solar cell 3, the storage battery 16 and the control unit 7 through the signal lines 51 to 53. In addition, the communications unit 72 outputs the information to the computation device 71. Furthermore, the communications unit 72 transmits operating instructions, transmitted from the computation device 71, to the solar cell 3, the storage battery 16 and the control unit 7.

The operation device 71 performs power control process, daytime power control process, nighttime power control process, and charge level recovery estimation process. The operation device 71 creates power generation change data DTA, total power generation amount per day DTB, and charge level change data DTC based on the amount of solar power generation amount PWS and the charge level CL of the storage battery 16. The power generation change data DTA is data including time points when the solar power generation amount PWS and the solar power generation amount PWS at each time point, and indicates variation in the solar power generation amount PWS depending on the time point. The total power generation amount per day DTB indicates the total solar power generation amount by the solar cell 3 on that date. The charge level change data DTC indicates variation in the charge level CL depending on the time point.

The solar power generation amount storage unit 73 stores the power generation change data DTA and the total power generation amount per day DTB as solar power generation data DT. The solar power generation data DT is maintained for several years. The solar power generation data DT is used as reference data when estimating change in the solar power generation amount PWS. The AC-DC power amount storage unit 74 stores an AC-DC power amount and a DC-AC electric power amount.

The battery charge level storage unit 75 stores the charge level CL that is actually measured and the charge level change data DTC. The DC power usage amount storage unit 76 stores the DC power usage amount, i.e. the amount of electric power that is consumed by the DC devices 5. The battery reference value storage unit 77 stores the backup level CLG and the reserve charge level CLA.

Figure 3:
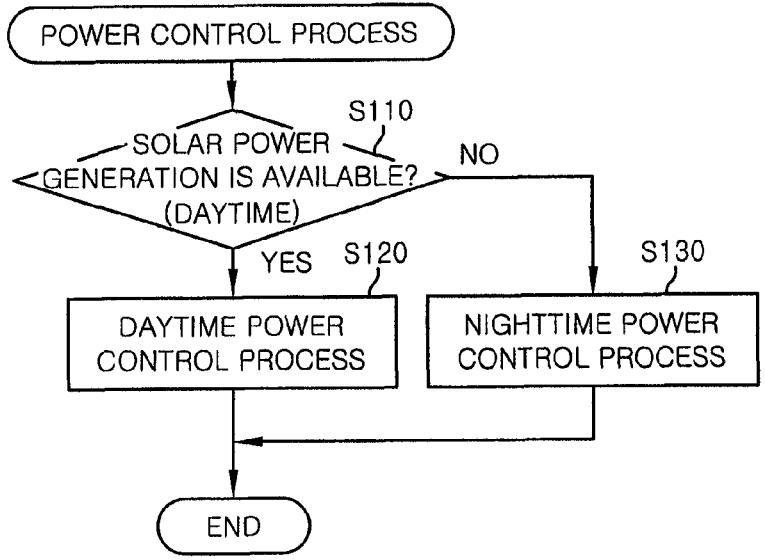
FIG. 3 is a flowchart showing a sequence of "power control process," which is performed by the power control device according to the same embodiment.

Referring to FIG. 3, a sequence of the power control process will now be described. This process is repeatedly performed at every operation cycle by the power control device 70.

The control of the storage battery 16 is performed differently during the daytime and the nighttime. That is, in step S110, it is determined whether or not it is the time when solar power generation is available. When the determination is affirmative, that is, it is determined to be the daytime in step S110, "daytime power control process" is performed in step S120. Meanwhile, when the determination is negative in step S110, "nighttime power control processing" is performed in step S130. In addition, the time zone during which power generation by the solar cell 3 is available is set to range from the time of sunrise to the time of sunset. That is, the length of the time zone varies depending on the season.

Figure 4:
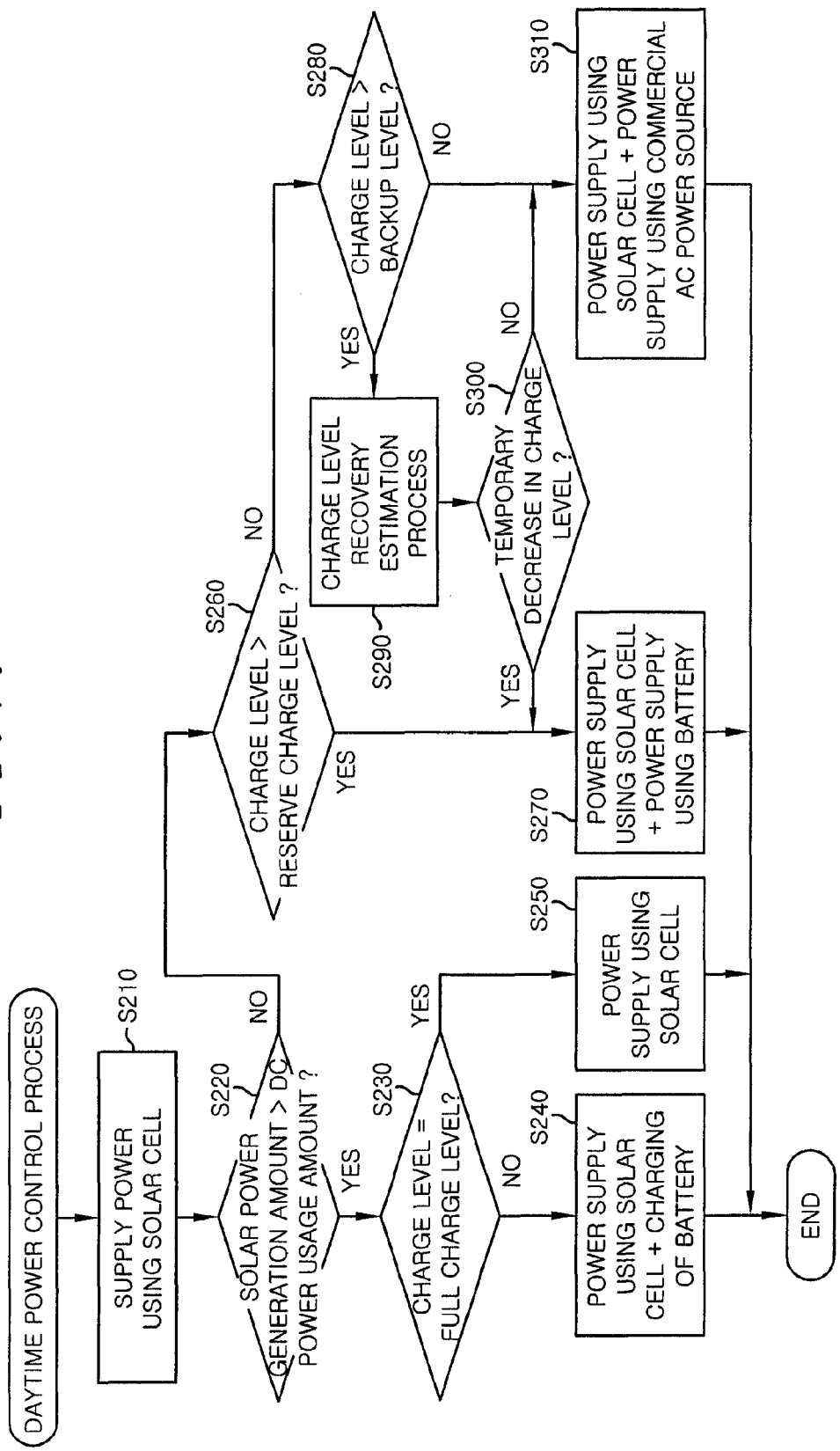
FIG. 4 is a flowchart showing a sequence of "daytime power control process" which is performed by the power control device.

Referring to FIG. 4, a sequence of the "daytime power control processing" performed by the power control device 70 will now be described. This process is repeatedly performed at every operation cycle by the power control device 70.

In step S210, electric power from the solar cell 3 is assigned to the supply of power to the DC devices 5 preferentially. When electric power from the solar cell 3 is in surplus or is not enough to be supplied to the DC devices 5, the following electric power control is performed.

In step S220, the solar power generation amount PWS by the solar cell 3 is compared with the total DC power usage amount PWD (power consumption) by the DC devices 5. Here, when it is determined that the solar power generation amount PWS is greater than the total DC power usage amount PWD, that is, when the solar power generation amount PWS is in surplus, it is determined, in step S230, whether or not the charge level CL of the storage battery 16 has reached a full charge level CLC.

When the charge level CL of the storage battery 16 has not reached the full charge level CLC, in step S240, the electric power from the solar cell 3 is assigned to the supply of power to the DC devices 5 and the surplus electric power is assigned to the charge of the storage battery 16. Here, the solar power generation amount PWS is equivalent to the sum of the total DC power usage amount PWD by the DC devices 5 and the charged power amount PWE in the storage battery 16. Meanwhile, when the charge level CL of the storage battery 16 has reached the full charge level CLC, in step S250, the electric power from the solar cell 3 is assigned to the supply of power to the DC devices 5, and the surplus electric power of the solar power generation amount PWS is supplied to the AC device 6 after being converted from DC to AC by the controller 7. At this time, the solar power generation amount PWS becomes equivalent to the sum of the total DC power usage amount PWD by the DC devices 5 and the amount of DC-to-AC converted electric power.

In step S220, when it is determined that solar power generation amount PWS does not exceed the DC power usage amount PWD, in step S260, it is determined whether or not the charge level CL of the storage battery 16 is greater than the reserve charge level CLA. That is, it is determined whether or not the shortage in the DC power usage amount PWD can be supplemented by the power from the storage battery 16.

When it is determined in step S260 that the charge level CL of the storage battery 16 is greater than the reserve charge level CLA, in step S270, an amount of electric power corresponding to the shortage in the DC power usage amount PWD is discharged from the storage battery 16 to be supplied to the DC devices 5. At this time, the sum of the solar power generation amount PWS and the amount of electric power PWF that is discharged from the storage battery 16 becomes equivalent to the total DC power usage amount PWD by the DC devices 5.

When it is determined in step S260 that the charge level CL of the storage battery 16 does not exceed the reserve charge level CLA, in step S280, it is determined whether or not the charge level CL of the storage battery 16 is greater than the backup level CLB.

When the determination in step S280 is affirmative, there is performed in step S290 a process to determine whether or not the charge level CL will recover up to the reserve charge level CLA (hereinafter, referred to as "charge level recovery estimation process"). Next, when the decrease in the charge level CL is determined to be temporary by the charge level recovery estimation process in step S300, it is estimated that the charge level CL will recover up to the reserve charge level CLA, and the storage battery 16 is discharged as in step S270. When it is determined in step S300 that the decrease in the charge level CL is determined not to be temporary, it is estimated that the charge level CL will not recover, and in step S310, an amount of electric power equal to the shortfall in the DC power usage amount PWD is supplied to the DC devices 5 by converting AC from the commercial AC power source 2 into DC. At this time, the sum of the amount of AC-to-DC converted electric power and the solar power generation PWS becomes equivalent to the total DC power usage amount PWD by the DC devices 5.

When it is determined in step S280 that the charge level CL of the storage battery 16 does not exceed the backup level CLB, in step S310, an amount of the electric power that is equal to the shortfall in the DC power usage amount PWD is supplied to the DC devices 5 by converting AC from the commercial AC power source 2 into DC, and the charge level CL is maintained at the backup level CLB.

Figure 5:
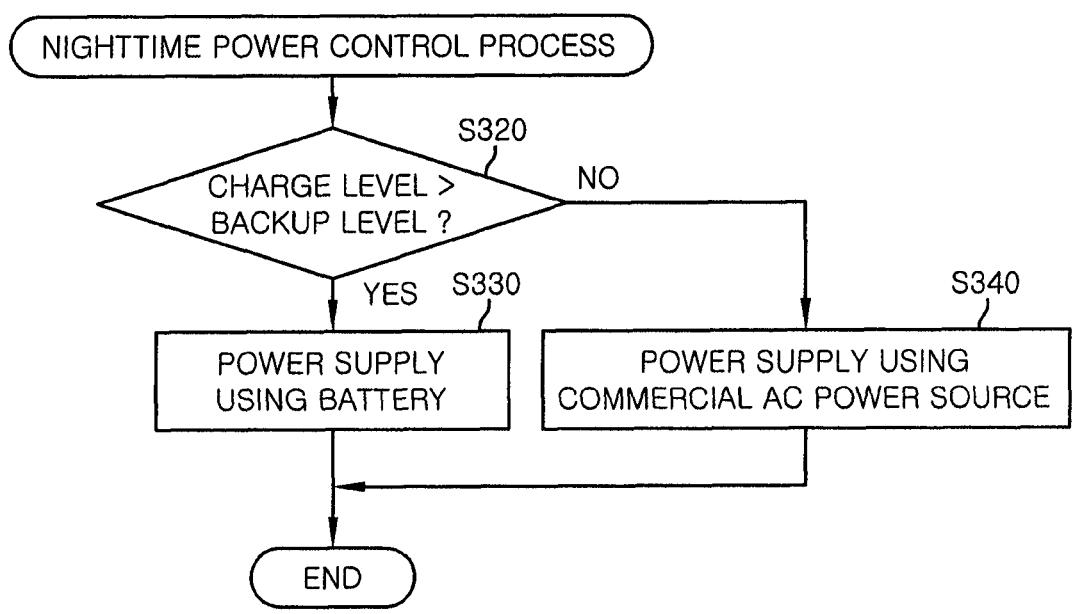
FIG. 5 is a flowchart showing a sequence of "nighttime power control process" which is performed by the power control device.

Referring to FIG. 5, a sequence of the nighttime power control process will now be described. This process is repeatedly performed at every operation cycle by the power control device 70. Since power generation by the solar cell 3 is not performed during the nighttime, electric power from the storage battery 16 and the commercial AC power source 2 is supplied to the DC devices 5. When surplus electric power is stored in the storage battery 16, discharge from the storage battery 16 is performed preferentially.

Specifically, in step S320, it is determined whether or not the charge level CL of the storage battery 16 is greater than the backup level CLB. When the determination in step S320 is affirmative, in step S330, the discharge from the storage battery 16 is performed and electric power is supplied to the DC devices 5. In contrast, when it is determined to be negative in step S320, in step S340, electric power is supplied to the DC devices 5 by converting AC from the commercial AC power source 2 to DC.

Figure 6:
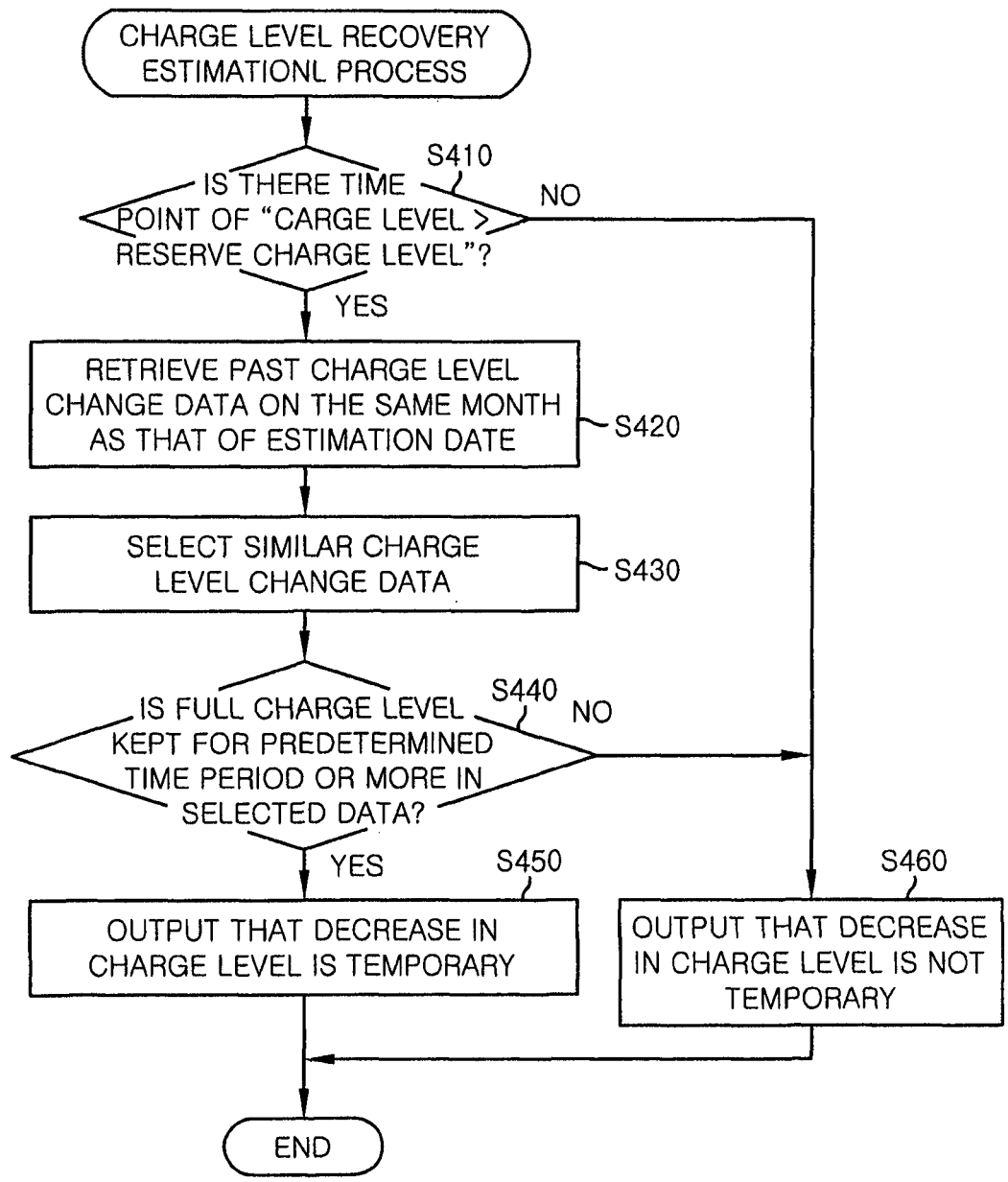
FIG. 6 is a flowchart showing a sequence of "charge level recovery estimation process" which is performed by the power control device.

Referring to FIG. 6, a sequence of "charge level recovery estimation process" performed in the daytime power control process will now be described. The charge level recovery estimation process is performed in the daytime when the solar power generation amount PSW is less than the DC power usage amount PWD by the DC devices 5 and in the case in which the charge level CL of the storage battery 16 does not exceed the reserve charge level CLA and is greater than the backup level CLB.

First, in step S410, it is determined whether or not there was a time point on that date at which the charge level CL exceeds the reserve charge level CLA before a time point at which the charge level recovery estimation processing is started. When the determination is affirmative, it is estimated that the solar power generation amount PWS, which was on an increasing trend, is on a decreasing trend.

Meanwhile, when it is determined in step S410 that there was no time point at which the charge level CL exceeds the reserve charge level CLA, it is estimated to be a time point when a small amount of solar power is generated because of the sun not having risen or it being overcast after the time point at which power generation was started. Therefore, the charge level recovery estimation process is stopped, and step S460 determines that the decrease in the charge level CL is not temporary.

When the determination in step S410 is affirmative, all of past charge level change data DTC on the same month as that of the date when the daytime power control process is performed are retrieved in step S420. In addition, when there are no past data, reference data which has been stored in advance is retrieved as reference data.

Afterwards, in step S430, the charge level change data DTC on the corresponding processing date is compared with the retrieved past charge level change data DTC, and data similar to the charge level change data DTC on the corresponding processing date is selected. The determination as to whether or not the data is similar is made based on whether or not the difference between the time point at which the charge level CL on the corresponding processing date first became higher than the reserve charge level CLA (hereinafter, referred to as "reserve charge level exceed time") and the time point at which the charge level CL exceeds the reserve charge level in the past charge level trend data DTC is within a predetermined tolerance range. In addition, when a plurality of similar data is selected from among the past charge level change data DTC, one closest to the time point at which the charge level CL became lower than the reserve charge level CLA is selected.

In step S440, it is determined whether or not there is a time when the charge level CL has increased and reached the full charge level CLC in the charge level change data DTC that is selected as the similar data (a first determination), and whether or not a time period until the charge level CL reaches the full charge level CLC exceeds a predetermined time period (a second determination). When the first determination and the second determination are affirmative, "the decrease in the charge level CL is temporary" is outputted (step S450). That is, based on that the time it takes to reach the full charge level CLC exceeds the predetermined time period in a case similar to the charge level change data DTC on the corresponding processing date, it is estimated that the charge level CL on the corresponding processing date also reaches the full charge level CLC later or that the charge level CL is reversed on the increasing trend. In contrast, when at least one of the first determination and the second determination is negative, output is made to the effect that the decrease in the charge level CL is not temporary (step S460).

Figure 7:
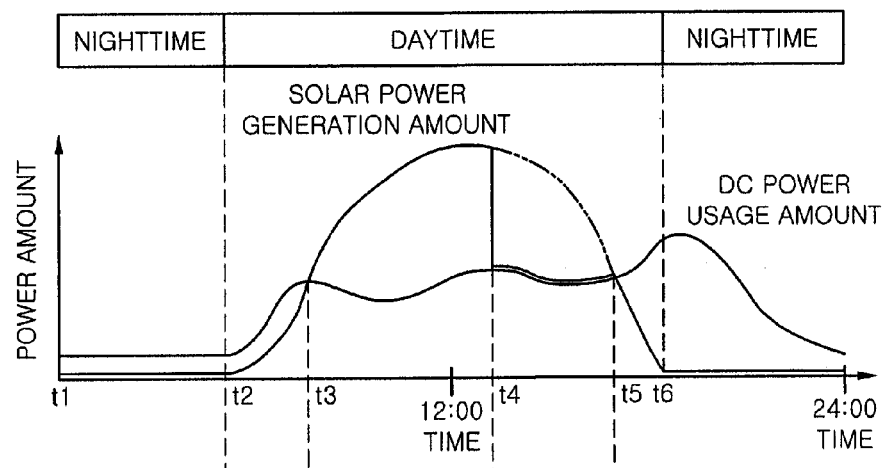
FIG. 7 is a timing chart showing an example of the control state of the energy storage system.
Figure 7:
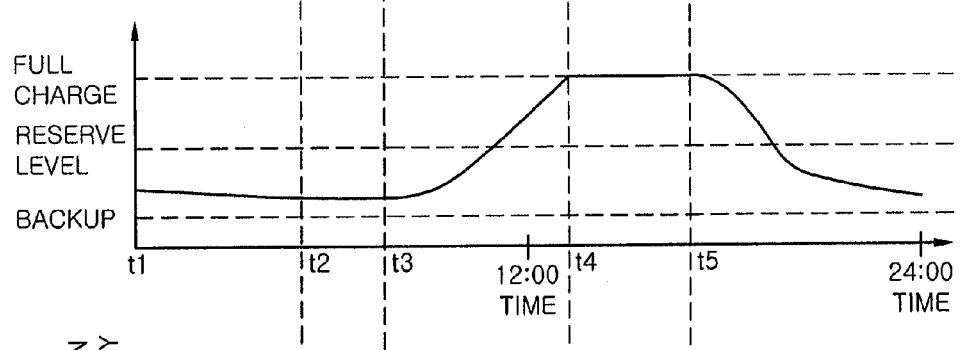
Figure 7:
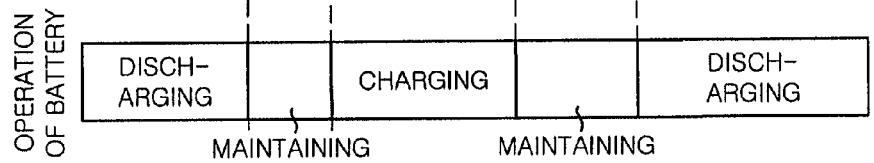
Figure 7:
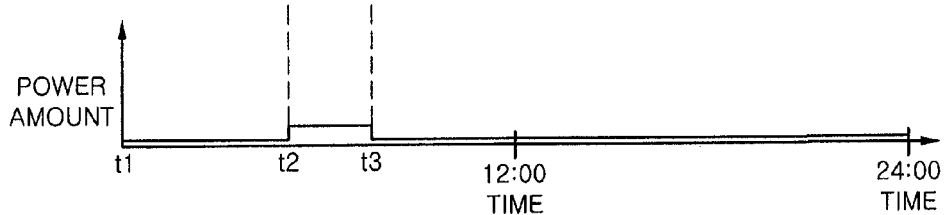

Referring to FIG. 7, there will be described the changes of a variety of parameters with respect to an example of the control state of the energy storage system 100. FIG. 7 shows profiles when it is clear all day and power generation is ideally performed by the solar cell.

At time point t1, the nighttime power control process is performed. At this time, the DC power usage amount PWD by the DC devices is furnished from the discharge from the storage battery 16 since the discharge is available with the charge level CL being greater than the backup level CLB.

At time point t2, the daytime power control process is started. Power generation by the solar cell 3 is performed from this time point, and power generated by the solar cell 3 is supplied to the DC devices 5. A shortage in electric power occurs since the solar power generation amount PWS is less than the DC power usage amount PWD by the DC devices 5. This shortfall in the electric power is supplemented by the commercial AC power source 2. In addition, in the daytime, the discharge is not performed in principle when the charge level CL does not exceed the reserve charge level CLA.

At time point t3, the solar power generation amount PWS by the solar cell 3 exceeds the DC power usage amount PWD by the DC devices 5, and the solar power generation amount PWS is in surplus. The storage battery 16 is charged with the surplus electric power. Then, the solar power generation amount PWS increases with the rising of the sun, and the charge level CL of the storage battery 16 also increases.

At time point t4, the charge level CL of the storage battery 16 reaches the full charge level CLC, no further charge can be performed. The charge level CL remains in the state of the full charge level CLC. At this time, while the solar power generation amount PWS exceeds the DC power usage amount PWD by the DC devices 5, the solar cell 3 is applied with a load that is smaller than its capacity to generate electric power. Therefore, the solar power generation amount PWS becomes equivalent to the total DC power usage amount PWD by the DC devices 5.

At time point t5, the solar power generation amount PWS by the solar cell 3 becomes less than the DC power usage amount PWD by the DC devices 5, and it becomes impossible to cover the DC power usage amount PWD by the DC devices 5 with the solar power generation amount PWS alone. At this time, the discharge from the storage battery 16 is performed, and the shortage in the amount of electric power is supplemented. Afterwards, since the solar power generation amount PWS decreases as the sun sets and the shortage in the electric power increases, the charge level CL of the storage battery 16 also becomes lower.

At time point t6, the nighttime power control process is started. Since the power generation by solar cell 3 is not performed, power discharged from the storage battery 16 is supplied to the DC devices 5. Afterwards, the DC power usage amount PWD by the DC devices 5 increases, and the discharge amount from the storage battery 16 also increases. At midnight, the DC power usage amount PWD by the DC devices 5 is lowered to standby power. In the example shown in FIG. 7, since a sufficient amount of electric power was charged in the storage battery 16 in the daytime, the DC power usage amount PWD by the DC devices 5 is furnished by the discharge from the storage battery 16 in the nighttime.

Figure 8:
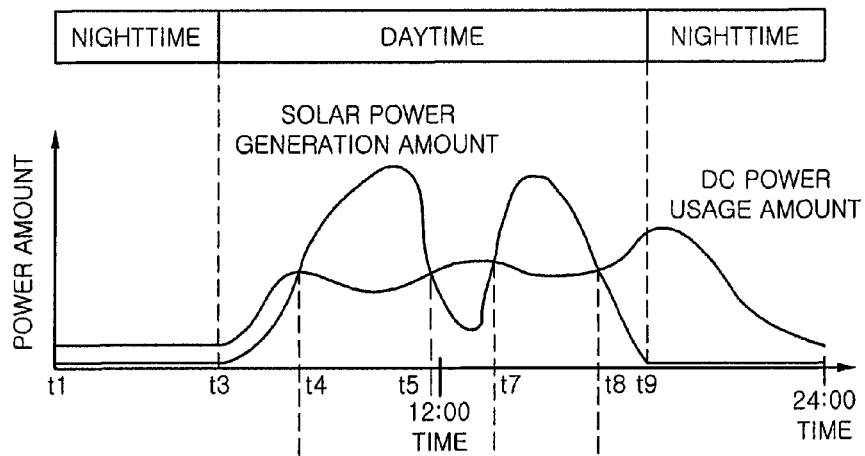
FIG. 8 is a timing chart showing another example of the control state of the energy storage system.
Figure 8:
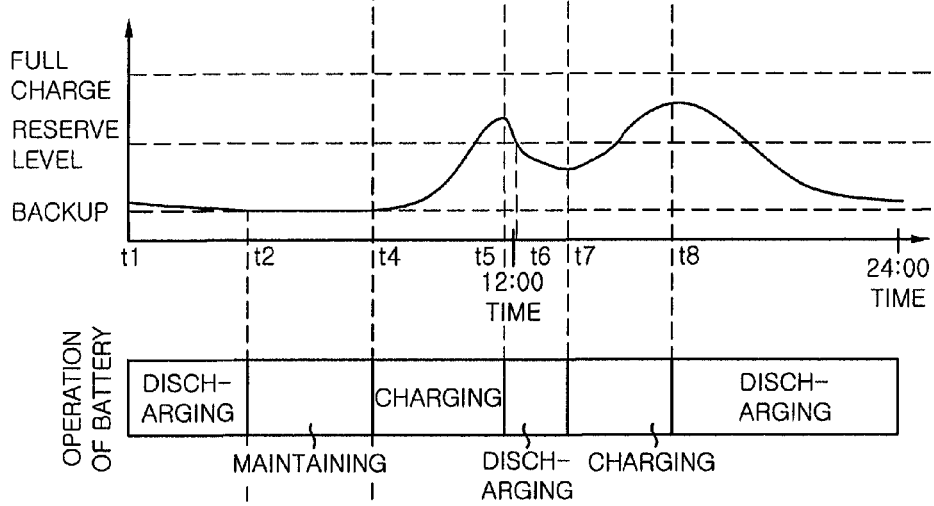
Figure 8:
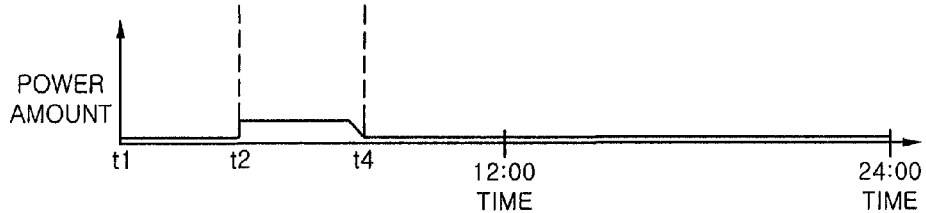

Referring to FIG. 8, there will be described the changes of the parameters with respect to another example of the control state of the energy storage system 100. FIG. 8 shows profiles when power generation by the solar cell 3 is temporarily decreased in response to a change in weather conditions.

At time point t1, since the charge level CL is greater than the backup level CLB, the DC power usage amount PWD by the DC devices 5 is furnished by the discharge from the storage battery 16. Afterwards, the charge level CL is gradually lowered and approaches the backup level CLB.

At time point t2, the charge level CL is lowered to the backup level CLB. At this time, discharge is not permitted so that the charge level CL of the storage battery 16 is not lowered below the backup level CLB, and the charge level CL is kept at the backup level CLB. At this time, the DC power usage amount PWD by the DC devices 5 is supplied by the electric power of the commercial AC power source 2.

At time point t3, the daytime power control process is started. From this time point, power generation by the solar cell 3 is performed, and the electric power generated by the solar cell 3 is supplied to the DC devices. At this time point, a shortage in the electric power occurs since the solar power generation amount PWS is less than the DC power usage amount PWD by the DC devices 5. In addition, since the charge level CL has not reached the reserve charge level CLA, the shortage in the electric power is furnished from the commercial AC power source 2.

At time point t4, the solar power generation amount PWS by the solar cell 3 exceeds the DC power usage amount PWD by the DC devices 5, and becomes in surplus. The storage battery 16 is charged with the surplus electric power. Then, the solar power generation amount PWS increases with the rising of the sun, and the charge level CL of the storage battery 16 also increases. Afterwards, the charge level CL exceeds the reserve charge level CLA.

At time point t5, the solar power generation amount PWS by the solar cell 3 becomes less than the DC power usage amount PWD by the DC devices 5. That is, the solar power generation amount PWS decreases in response to a change in weather conditions. At this time, the discharge from the storage battery 16 is performed since it becomes impossible to cover the DC power usage amount PWD by the DC devices 5 with the solar power generation amount PWS alone.

At time point t6, the charge level CL of the storage battery 16 is decreased to the reserve charge level CLA. At this time, "charge level recovery estimation process" is performed to determine whether or not the decrease in the charge level CL is temporary. This example shows a case in which the charge level change data DTC of the processing date is compared with the charge level change data DTC selected from the data on the same month in the past, and the charge level CL is determined to recover up to the reserve charge level CLA. In this case, the discharge is performed to a level that is lower than the reserve charge level CLA. Afterwards, the decreasing trend of the solar power generation amount PWS is reversed and becomes on an increase trend.

At time point t7, the solar power generation amount PWS exceeds the DC power usage amount PWD by the DC devices 5. At this time, the storage battery 16 is charged with the surplus electric power of the solar power generation amount PWS. Afterwards, the charge level CL gradually increases, and exceeds the reserve charge level CLA again.

At time point t8, the solar power generation amount PWS becomes less than the DC power usage amount PWD by the DC devices 5, and it becomes impossible to cover the DC power usage amount PWD by the DC devices 5 with the solar power generation amount PWS alone. At this time, power is discharged from the storage battery 16 to supplement the shortage in the amount of electric power.

At time point t9, the nighttime power control process is started. Electric power discharged from the storage battery 16 is supplied to the DC devices 5. Afterwards, the DC power usage amount PWD by the DC devices 5 increases, and the discharge amount from the storage battery 16 also increases so that the charge level CL is lowered.

Figure 9:
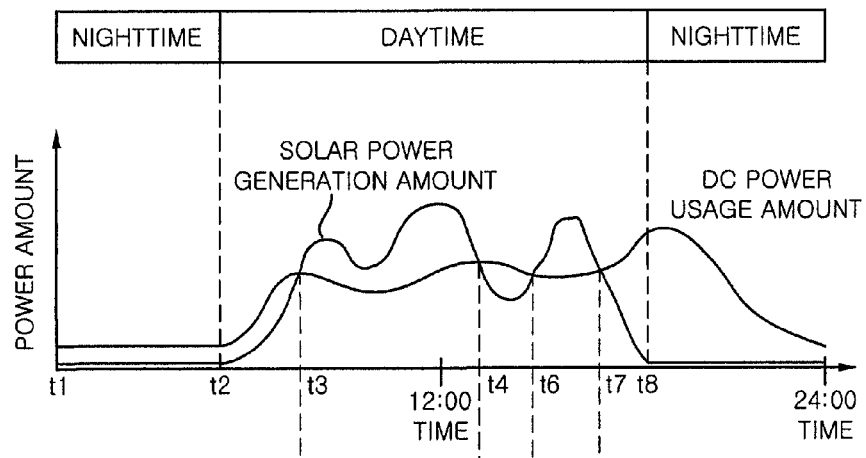
FIG. 9 is a timing chart showing a further example of the control state of the energy storage system.
Figure 9:
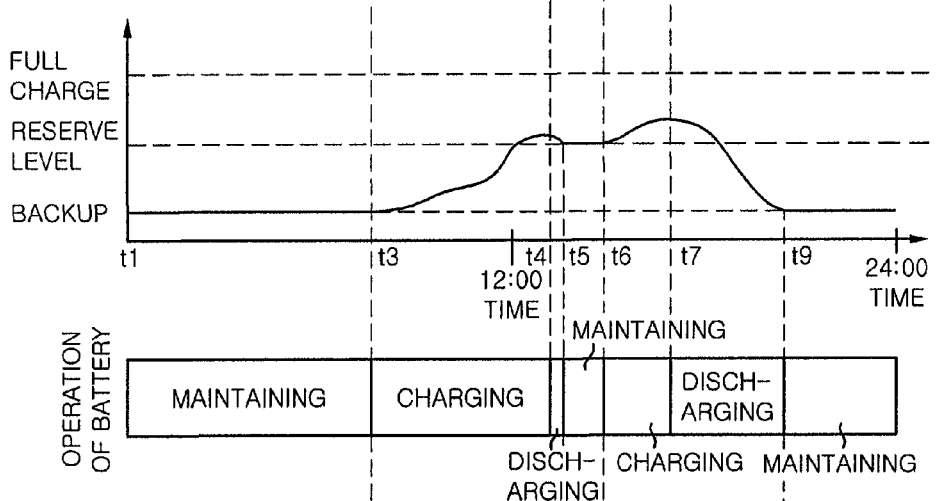
Figure 9:
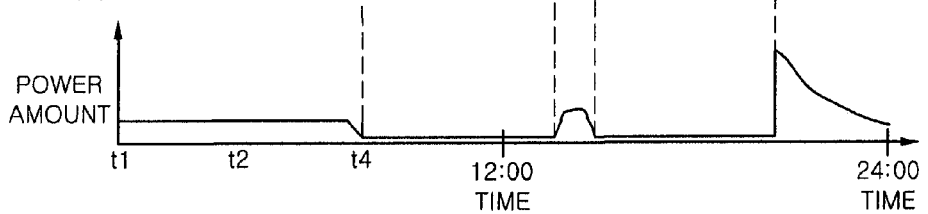

Referring to FIG. 9, there will be described the changes of the parameters with respect to a further example of the control state of the energy storage system 100. FIG. 9 shows profiles when weather conditions are unstable and thus the amount of electric power generated by the solar cell 3 is small.

At time point t1, the charge level CL is on the backup level CLB. Therefore, the DC power usage amount PWD by the DC devices 5 at midnight is furnished by electric power from the commercial AC power source 2.

At time point t2, the daytime power control process is started. From this time point, power generation by the solar 3 is performed, and the generated electric power is supplied to the DC devices 5. Since the solar power generation amount PWS is less than the DC power usage amount PWD by the DC devices 5, there is a shortage in electric power. This shortage in the electric power is supplemented by the commercial AC power source 2.

At time point t3, the solar power generation amount PWS by the solar cell 3 exceeds the DC power usage amount PWD by the DC devices 5, and becomes in surplus. The storage battery 16 is charged with the surplus electric power. After that, the solar power generation amount PWS increases with the rising of the sun, and the charge level CL of the storage battery 16 increases also. Afterwards, the charge level CL exceeds the reserve charge level CLA.

At time point t4, the solar power generation amount PWS by the solar cell 3 becomes less than the DC power usage amount PWD by the DC devices 5. That is, the solar power generation amount PWS decreases in response to a change in weather conditions. At this time, the discharge from the storage battery 16 is performed since it becomes impossible to cover the DC power usage amount PWD by the DC devices 5 with the solar power generation amount PWS alone.

At time point t5, the charge level CL of the storage battery 16 is lowered to the reserve charge level CLA. At this time, "charge level recovery estimation process" is performed to determine whether or not the decrease in the charge level CL is temporary. In this example, the charge level change data DTC of the processing date is compared with the charge level change data DTC selected from the data on the same month in the past, and it is estimated that the charge level CL does not recover up to the reserve charge level CLA. Therefore, any discharge which makes the charge level CL below the reserve charge level CLA is not permitted. That is, at this time point, the discharge of the storage battery 16 is interrupted, and a shortage in the electric power is supplemented by the commercial AC power source 2.

At time point t6, the solar power generation amount PWS by the solar cell 3 exceeds the DC power usage amount PWD by the DC devices 5. That is, the solar power generation amount PWS recovers and increases. The storage battery 16 is charged with the surplus electric power of the solar power generation amount PWS. Afterwards, the charge level CL gradually increases.

At time point t7, the solar power generation amount PWS by the solar cell 3 becomes less than the DC power usage amount PWD by the DC devices 5, and it becomes impossible to cover the DC power usage amount PWD by the DC devices 5 with the solar power generation amount PWS alone. At this time, the discharge from the storage battery 16 is performed to supplement the shortage in the amount of electric power.

At time point t8, the nighttime power control process is started. Electric power discharged from the storage battery 16 is supplied to the DC devices 5. Afterwards, the DC power usage amount PWD by the DC devices 5 increases, and the discharge amount from the storage battery 16 also increases to decrease the charge level CL.

At time point t9, the charge level CL is lowered to the backup level CLB. In order to maintain the backup level CLB, the discharge from the storage battery 16 is not permitted. The shortage in the electric power is supplemented by the commercial AC power source 2.

The following effects can be obtained from the energy storage system 100 in accordance with the present embodiment.

(1) In the present embodiment, in the daytime, the discharge from the storage battery 16 to the DC devices 5 is permitted when the solar power generation amount PWS is less than the DC power usage amount PWD by the DC devices 5 and the charge level CL of the storage battery 16 is higher than the reserve charge level CLA. In the daytime, when the solar power generation amount PWS is less than the DC power usage amount PWD by the DC devices 5 and the charge level CL of the storage battery 16 is not greater than the reserve charge level CLA, the discharge from the storage battery 16 to the DC devices 5 is not allowed.

At night, the discharge from the storage battery 16, which makes the charge level CL of the storage battery 16 lower than the reserve charge level CLA, is permitted.

In this configuration, in the daytime, the storage battery 16 is charged with the electric power from the solar cell 3, and the discharge from the storage battery 16 is permitted when power generated by the solar cell 3 does not exceed the DC power usage amount PWD by the DC devices 5 to cause a shortage in the electric power. Meanwhile, if the charge level CL of the storage battery 16 is not greater than the reserve charge level CLA, the discharge from the storage battery 16 is not permitted so that electric power to be used at night is ensured. At night, the capacity of the storage battery 16 is permitted to drop below the reserve charge level CLA, and the electric power stored in the storage battery 16 during the daytime is used. In this way, when the electric power is supplied by the storage battery 16 in the nighttime, it is possible to suppress the case where electric power cannot be supplemented by the discharge from the storage battery 16.

(2) In the present embodiment, in the daytime and the nighttime, the electric power is supplied to the DC devices 5 from at least one of the solar cell 3 and the commercial AC power source 2 so that the charge level CL of the storage battery 16 does not drop below the backup level CLB. In addition, in an emergency in which the electric power is not supplied from the solar cell 3 and the commercial AC power source 2 to the DC devices 5, the discharge from the storage battery 16, which makes the charge level CL lower than the backup level CLB, is permitted.

According to this configuration, the charge level CL of the storage battery 16 is maintained at a level equal to or higher than the backup level CLB throughout the daytime and the nighttime. Meanwhile, in an emergency in which the electric power is not supplied from the commercial AC power source 2 and the solar cell 3, the discharge from the storage battery 16 is permitted. Therefore, the electric power can be furnished to the DC devices 5 even in a power supply emergency.

(3) In the present embodiment, in the daytime, when the amount of the power generation of the solar cell 3 drops below the DC power usage amount PWD by the DC devices 5 and the charge level CL of the storage battery 16 is changed to a lower level from a higher level than the reserve charge level CLA, the following determination process is performed. That is, based on the past charge level change data DTC, in which the charge level CL is kept at the full charge level CLC for a predetermined period or more, it is determined whether or not the charge level CL will recover up to the reserve charge level CLA before night even though the permission to discharge from the storage battery 16 is maintained. When the charge level CL is determined to recover by this determination, the permission to supply electric power from the storage battery 16 to the DC devices 5 is maintained.

According to this configuration, in the daytime, when the amount of electric power generated by the solar cell 3 is less than the DC power usage amount PWD by the DC devices and the charge level CL of the storage battery 16 is changed to a lower level from a higher level than the reserve charge level CLA, the following determination process is performed. That is, the past charge level change data DTC, in which the charge level CL is kept at the full charge level CLC for the predetermined period or more, is compared with the charge level change data DTC on the date of performing the determination process. When the charge level CL is determined to recover up to the reserve charge level CLA, the permission to discharge from the storage battery 16 to the DC devices 5 is maintained. That is, in the daytime, when the charge level CL is lower than the reserve charge level CLA, typical process does not permit discharge from the storage battery 16 to ensure enough electric power to be used in the nighttime. In contrast, when the charge level CL is expected to recover even if the discharge is continuously permitted, the discharge from the storage battery 16 to the DC devices 5 is permitted. with such process, the capacity stored in the storage battery 16 can be optimally used depending on the situation in which the charge level CL of the storage battery 16 becomes lower, and thus the use of the electric power from the commercial AC power source 2 can be reduced.

(4) In the charge level recovery estimation process, based on the similarity between the charge level change data DTC indicating the change of the charge level CL of the storage battery 16 in the past and the charge level change data DTC on the date when the determination is made, a past date having a charge level change which approximates the change of the charge level CL is selected. Further, it is determined whether or not the full charge level period during which the charge level CL reaches the full charge level CLC in the charge level change data DTC on the selected past date is equivalent to a predetermined period or more. In the determination, when the full charge level period is determined to be the predetermined period or more, the charge level CL is determined to recover and the discharge from the storage battery 16 to the load devices 5 is continuously permitted.

According to this configuration, in the determination that the charge level CL will recover, as described above, the past charge level change data DTC, which approximates the charge level change data on the date when the determination process is performed, is selected. In addition, in the charge level CL on the date of the selected charge level change data DTC, it is determined whether or not the full charge level period is equivalent to the predetermined time period or more. That is, since it is determined whether or not the charge level on the date of the determination will recover later based on the past data on the date including the data approximate to that on the date of the determination, the accuracy of the determination can be improved.

(5) In the present embodiment, a charge level corresponding to the amount of electric power per night that is used in the nighttime is set as the reserve charge level CLA. According to this configuration, the electric power that is used in the nighttime can be furnished using the amount of electric power that is charged in the storage battery 16 in the daytime, and thus the use of the electric power that is supplied from the commercial AC power source 2 can be reduced.

Other Embodiments

The energy storage system 100 of the present invention are not limited to the aforementioned embodiment, but may be modified as the following embodiments. In addition, the following modifications are not limited to the aforementioned embodiment, but may be implemented by combining the modifications.

In the aforementioned embodiment, the backup level CLB is set to the charge level CL that corresponds to the amount of electric power in an emergency in which the electric power is not supplied from the solar cell 3 and the commercial AC power source 2. Instead of the above, the backup level CLB may be set to a value that is greater than the charge level CL that corresponds to the amount of emergency electric power. In this case, it is possible to supply more electric power in an emergency.

In the aforementioned embodiment, the reserve charge level CLA is set to a level corresponding to the amount of electric power consumed at night. Instead of the above, however, the reserve charge level CLA may be set to a level that is lower than the amount of electric power consumed at night. With this configuration, part of the electric power that is used at night is supplemented by the amount of electric power charged in the storage battery 16 in the daytime, so that the use of the electric power supplied from the commercial AC power source 2 can be reduced. The above is effective when the maximum capacity to be charged in the storage battery 16 is less than the total amount of electric power that is used at night.

In addition, the reserve charge level CLA may be set as follows. Specifically, the reserve charge level CLA is set to be equivalent to the amount of electric power obtained by deducting the amount of electric power of the commercial AC power source 2 that is used in the low-price time zone from the amount of electric power to be used at night. In this case, in the low-price time zone, the electric power from the commercial AC power source 2 is used. The reasons for the above are as follows.

The electricity rate of the commercial AC power source 2 is divided into normal rate and low rate depending on the time zones. Specifically, one day is divided into a normal time zone in which the electricity rate is normal, and a low-price time zone in which the electricity rate is low. In consideration of this, in the present invention, the reserve charge level CLA is set to a value corresponding to the amount of electric power obtained by deducting the amount of low-price electric power of the commercial AC power source 2 that is used in the low-price time zone from the amount of electric power that is used at night. That is, in the low-price time zone, the electric power is set to be insufficient, and the electric power from the commercial AC power source 2 is used in the low-price time zone. Accordingly, as for the electric power used at night, the electric power supplied at the low electricity rate is effectively used, so that thus the electricity costs can be reduced.

In the "charge level recovery estimation process" of the foregoing embodiment, data similar to that on the date of the determination process is selected and the determination is made by comparing the charge level change data DTC on the determination process date with past charge level change data DTC. However, the following process may be performed instead of the above.

Specifically, the determination as to whether or not the charge level CL will recover is also based on the solar power generation amount PWS. Thus, it is determined the similarity between power generation amount change data DTA indicating a past change in the solar power generation amount PWS and power generation amount change data DTA on a date when the determination process is performed, and a past date having the change in the solar power generation amount PWS approximating the power generation amount change data DTA on the date of the determination is selected. It is determined whether or not the full charge level period during which the charge level reaches the full charge level in the charge level change data on the selected date is equivalent to the predetermined period or more. When the full charge level period is determined to be equivalent to the predetermined period or more, the charge level may be determined to recover and the discharge from the storage battery to the load device may be permitted. In the similarity determination process, the similarity is determined based on whether or not the time point required for the solar power generation amount PWS to reach a predetermined threshold on the determination process date and the time point for the solar power generation amount PWS to reach a predetermined threshold of in the selected past power generation change data DTA are within a predetermined tolerance range. When the time points of the both data are within the predetermined tolerance range, both data are determined to be similar. When the time points are not within the predetermined tolerance range, the data are determined not to be similar. In addition, in the similarity determination process, instead of the above, the similarity may be determined based on the curve data of both change data.

According to this configuration, whether or not the charge level CL on the date of the determination will recover later is determined based on the past data on the date having data similar to that on the date of the determination, and thus the accuracy of the determination can be improved.

In the "charge level recovery estimation process" of the foregoing embodiment, the following recovery of the charge level CL is estimated by comparing the change in the charge level CL with the past data. This estimation is performed on the assumption that the charge level CL is associated with the solar power generation amount PWS.

However, the factors of decreasing the charge level CL are regarded to include a decrease in the solar power generation amount PWS and an increase in the DC power usage amount PWD by the DC devices 5. Furthermore, in consideration of this, in place of or in addition to the foregoing "charge level recovery estimation process", the following process may be performed.

Specifically, when the charge level recovery estimation process is performed, it is determined whether or not there was a time point when the charge level CL exceeds the reserve charge level CLA on that date prior to the time point when the charge level recovery estimation processing was started, as in step S410. Here, when the determination is affirmative, the past power consumption change data of the DC devices 5, which was recorded over the same period as the date of the estimation process, is retrieved. From among the power consumption change data, there is selected a past date having power consumption change data from a given time (e.g. 6 A.M.) to the time when the estimation process is started which is similar to that on the date. In addition, in the charge level change data on the selected date, it is determined whether or not there was a time when the charge level CL increases to reach the full charge level CLC (first determination) and whether or not the period during which the charge level CL reaching the full charge level CLC exceeds a predetermined time (second determination). When both the first determination and the second determination are affirmative, it is output that a decrease in the charge level CL is temporary. When at least one of the first determination and the second determination is negative, it is output that the decrease in the charge level CL is not temporary.

In the foregoing embodiment, in the step S410 of "charge level recovery estimation process," it is determined whether or not there was a time point when the charge level CL exceeds the reserve charge level CLA before a time point when the charge level recovery estimation process was started. However, instead of the above, the following determination process may be performed. That is, in the same step, it may be determined whether or not the time when the charge level recovery estimation process was started is after a predetermined time. In this case, the predetermined time is set such that, after the charge level CL is changed to increase after the predetermined time, a sufficient time is ensured until the charge level CL exceeds the reserve charge level CLB. Since it is taken as a given that the charge level CL will not recover up to the charge level CLB when the charge level recovery estimation process is started after 5 P.M., the predetermined time is set to a time point, such as 0 P.M. In addition, the predetermined time may be set depending on the season.

In the foregoing embodiment, in the step S220 of "daytime power control process," the solar power generation amount is compared with the total DC power usage amount by the DC devices. In this case, the DC power usage amount by the DC devices may be defined as the amount including the amount of DC-to-AC converted electric power.

In the foregoing embodiment, the time zone, in which power generation by the solar cell 3 is possible, is set as a time zone from the time of sunrise to the time of sunset. However, instead of the above, the corresponding time zone may be set to a time zone from a predetermined time point after several hours from sunrise to another predetermined time point before several hours from sunset.

While the invention has been shown and described with respect to the embodiments, it will be understood by those skilled in the art that various changes and modification may be made without departing from the scope of the invention as defined in the following claims.

What is claimed is:

1. An energy storage system comprising a storage battery, a solar cell and a commercial AC power source,
    wherein, when a charge level of the storage battery is not greater than a reference charge level, a discharge from the storage battery to a load device is permitted or prohibited depending on a time zone,
    wherein the storage battery is charged with electric power from the solar cell,
    wherein electric power from at least one of the solar cell, the commercial AC power source, and the storage battery is supplied to the load device,
    wherein, in the daytime, when an amount of electric power generated by the solar cell is less than an amount of electric power consumed by the load device and the charge level of the storage battery is higher than the reference charge level, the discharge from the storage battery to the load device is permitted,
    wherein, in the daytime, when the amount of electric power generated by the solar cell is less than the amount of electric power consumed by the load device and the charge level of the storage battery is not higher than the reference charge level, the discharge from the storage battery to the load device is not permitted, and
    wherein the discharge from the storage battery which makes the charge level of the storage battery lower than the reference charge level is permitted at night.

2. The energy storage system of claim 1, wherein a backup level is set as a reference value of the charge level of the storage battery, the backup level being lower than the reference charge level and corresponding to an amount of electric power that is used in an emergency in which electric power is not supplied from the solar cell nor the commercial AC power source to the load device,
    wherein supply of electric power from at least one of the solar cell and the commercial AC power source to the load device is performed so that the charge level of the storage battery is equal to or higher than the backup level in the daytime and at night, and
    wherein, in the emergency, the discharge from the storage battery which makes the charge level lower than the backup level is permitted.

3. The energy storage system of claim 2, wherein, in the daytime, when the amount of electric power generated by the solar cell is less than the amount of electric power consumed by the load device and the charge level of the storage battery is not greater the reference charge level, a determination process is performed based on past charge level change data in which a time period during which the charge level reaches a fully charged level is equivalent to a predetermined time period or more, to determine whether or not the charge level recovers to the reference charge level before night in a state in which the discharge from the storage battery is permitted, and when the charge level is determined to recover by the determination process, the permission of the discharge from the storage battery to the load device is maintained.

4. The energy storage system of claim 3, wherein in the determination process, based on similarity between charge level change data indicating a past change in the charge level of the storage battery, and charge level change data on a date when the determination process is performed, a past date having a charge level change which approximates a charge level change on the date of the determination process is selected; it is determined whether or not a full charge level period during which the charge level reaches a full charge level in the charge level change data on the selected date is equivalent to a predetermined time period or more; and when the full charge level period is determined to be equivalent to the predetermined time period or more, it is determined that the charge level will recover and the permission of the discharge from the storage battery to the load device is maintained.

5. The energy storage system of claim 4, wherein in the determination process, based on similarity between power generation amount change data indicating a past change in power generation amount by the solar cell, and power generation amount change data on a date when the determination process is performed, a past date having a power generation amount change approximating a power generation amount change on the date of the determination process is selected; it is determined whether or not a full charge level period during which the charge level reaches a full charge level in the charge level change data on the selected date is equivalent to a predetermined time period or more; and when the full charge level period is determined to be equivalent to the predetermined time period or more, it is determined that the charge level will recover and the permission of the discharge from the storage battery to the load device is maintained.

6. The energy storage system of claim 2, wherein the reference charge level is set to a level that corresponds to an amount of electric power that is consumed by the load device at night.

7. The energy storage system of claim 2, wherein, when time zones in which an electricity rate of the commercial AC power source is determined include a normal time zone in which the electricity rate is normal and a low-price time zone in which the electricity rate is lower than normal, the reference charge level is set to a level corresponding to an amount obtained by deducting an amount of electric power that is used in the low-price time zone from an amount of electric power that is consumed by the load device at night.

8. The energy storage system of claim 1, wherein when, in the daytime, the amount of electric power generated by the solar cell is less than the amount of electric power consumed by the load device and the charge level of the storage battery is not greater the reference charge level, a determination process is performed based on past charge level change data in which a time period during which the charge level reaches a fully charged level is equivalent to a predetermined time period or more, to determine whether or not the charge level recovers to the reference charge level before night in a state in which the discharge from the storage battery is permitted, and when the charge level is determined to recover by the determination process, the permission of the discharge from the storage battery to the load device is maintained.

9. The energy storage system of claim 8, wherein in the determination process, based on similarity between charge level change data indicating a past change in the charge level of the storage battery, and charge level change data on a date when the determination process is performed, a past date having a charge level change which approximates a charge level change on the date of the determination process is selected; it is determined whether or not a full charge level period during which the charge level reaches a full charge level in the charge level change data on the selected date is equivalent to a predetermined time period or more; and when the full charge level period is determined to be equivalent to the predetermined time period or more, it is determined that the charge level will recover and the permission of the discharge from the storage battery to the load device is maintained.

10. The energy storage system of claim 9, wherein the reference charge level is set to a level that corresponds to an amount of electric power that is consumed by the load device at night.

11. The energy storage system of claim 9, wherein, when time zones in which an electricity rate of the commercial AC power source is determined include a normal time zone in which the electricity rate is normal and a low-price time zone in which the electricity rate is lower than normal, the reference charge level is set to a level corresponding to an amount obtained by deducting an amount of electric power that is used in the low-price time zone from an amount of electric power that is consumed by the load device at night.

12. The energy storage system of claim 8, wherein in the determination process, based on similarity between power generation amount change data indicating a past change in power generation amount by the solar cell, and power generation amount change data on a date when the determination process is performed, a past date having a power generation amount change approximating a power generation amount change on the date of the determination process is selected; it is determined whether or not a full charge level period during which the charge level reaches a full charge level in the charge level change data on the selected date is equivalent to a predetermined time period or more; and when the full charge level period is determined to be equivalent to the predetermined time period or more, it is determined that the charge level will recover and the permission of the discharge from the storage battery to the load device is maintained.

13. The energy storage system of claim 12, wherein the reference charge level is set to a level that corresponds to an amount of electric power that is consumed by the load device at night.

14. The energy storage system of claim 12, wherein, when time zones in which an electricity rate of the commercial AC power source is determined include a normal time zone in which the electricity rate is normal and a low-price time zone in which the electricity rate is lower than normal, the reference charge level is set to a level corresponding to an amount obtained by deducting an amount of electric power that is used in the low-price time zone from an amount of electric power that is consumed by the load device at night.

15. The energy storage system of claim 8, wherein the reference charge level is set to a level that corresponds to an amount of electric power that is consumed by the load device at night.

16. The energy storage system of claim 8, wherein, when time zones in which an electricity rate of the commercial AC power source is determined include a normal time zone in which the electricity rate is normal and a low-price time zone in which the electricity rate is lower than normal, the reference charge level is set to a level corresponding to an amount obtained by deducting an amount of electric power that is used in the low-price time zone from an amount of electric power that is consumed by the load device at night.

17. The energy storage system of claim 1, wherein the reference charge level is set to a level that corresponds to an amount of electric power that is consumed by the load device at night.

18. The energy storage system of claim 1, wherein, when time zones in which an electricity rate of the commercial AC power source is determined include a normal time zone in which the electricity rate is normal and a low-price time zone in which the electricity rate is lower than normal, the reference charge level is set to a level corresponding to an amount obtained by deducting an amount of electric power that is used in the low-price time zone from an amount of electric power that is consumed by the load device at night.

19. A power control device configured to:
control a storage battery to be charged with electric power from a solar cell;
control electric power from at least one of the solar cell, a commercial AC power source and the storage battery to be supplied to a load device, when a charge level of the storage battery is not greater than a reference charge level, permit or prohibit a discharge from the storage battery to the load device depending on a time zone;
in the daytime, when an amount of electric power generated by a solar cell is less than an amount of electric power consumed by the load device and the charge level of the storage battery is higher than the reference charge level, permit the discharge from the storage battery to the load device;
in the daytime, when the amount of electric power generated by the solar cell is less than the amount of electric power consumed by the load device and the charge level of the storage battery is not higher than the reference charge level, prohibit the discharge from the storage battery to the load device; and permit the discharge from the storage battery which makes the charge level of the storage battery lower than the reference charge level at night.

* * * * *